Nov. 22, 1949 E. F. PEVERE 2,488,602
C₄ ALKYLATION WITH ALUMINUM CHLORIDE-HYDROCARBON
COMPLEX CATALYST
Filed Sept. 27, 1946
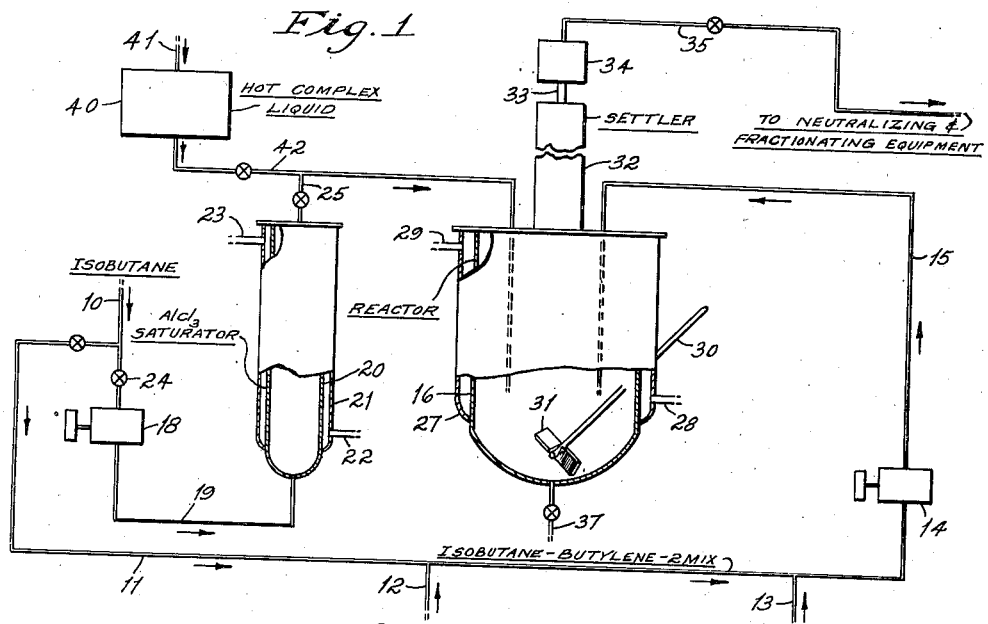
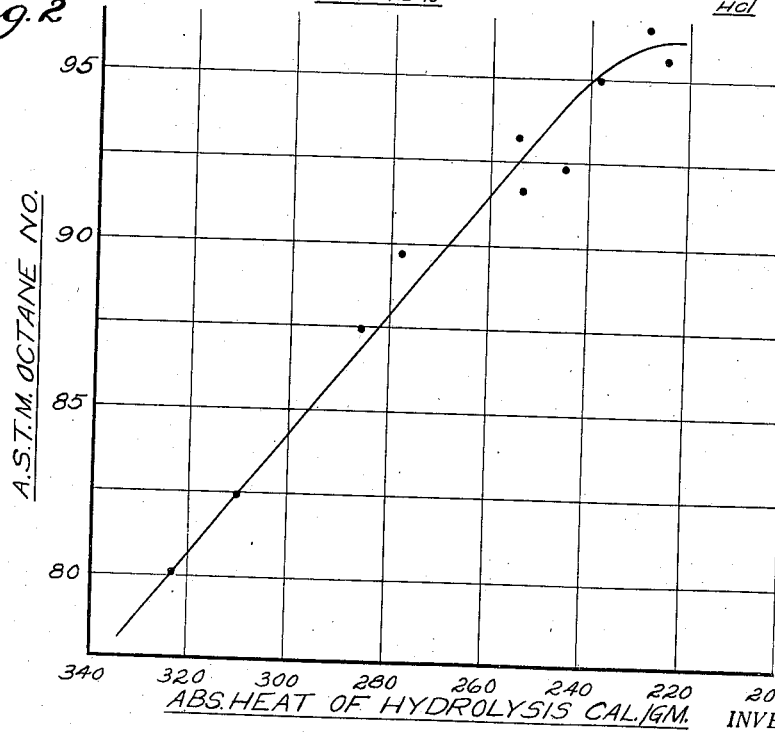
INVENTOR.
ERNEST F. PEVERE
BY
Daniel Stryker
ATTORNEY Patented Nov. 22, 1949

2,488,602

UNITED STATES PATENT OFFICE 2,488,602

C4 ALKYLATION WITH ALUMINUM CHLORIDE-HYDROCARBON COMPLEX CATALYST

Ernest F. Pevere, Beacon, N. Y., assignor to The Texas Company, New York, N. Y., a corporation of Delaware Application September 27, 1946, Serial No. 699,663

2 Claims. (Cl. 260—683.4)

This invention relates to catalytic alkylation of isobutane with butylene-2 in the presence of an aluminum chloride-hydrocarbon complex catalyst of controlled activity.

The catalytic alkylation of isobutane with a normal butylene, as well as other $C_4$ olefins, in the presence of an aluminum chloride catalyst and a hydrogen chloride promoter, has heretofore been proposed. However, alkylation of the $C_4$ olefins with aluminum chloride catalyst has invariably produced an alkylate having a comparatively low octane rating, and the life of the catalyst has been short. Consequently, the process has not been economically attractive in comparison with commercially developed processes employing sulfuric acid and hydrofluoric acid as the catalysts.

It has now been discovered that a high yield of good quality alkylate can be produced with excellent catalyst life by alkylating isobutane with butylene-2 as substantially the sole olefinic constituent under controlled temperature conditions within the range of about 40–80° F., in the presence of an aluminum chloride-hydrocarbon complex liquid catalyst containing sufficient reaction product of isobutane and butylene-2 with the aluminum chloride content of the complex liquid catalyst to reduce the absolute heat of hydrolysis of said catalyst to within the range of about 220–255 small calories per gram of complex liquid. Under these conditions a total debutanized akylate has been obtained, of which at least 90% by volume boils below 375° F. and has a clear CFRM octane number in excess of 92 and generally of the order of 94–96. Moreover, the catalyst life is excellent, giving yields greater than thirty gallons of alkylate per pound of aluminum chloride consumed.

The use of aluminum chloride-hydrocarbon complex liquid cataylst, particularly for the alkylation of isobutane with ethylene and for isomerization of normal paraffin, such as normal butane, is well known. These complex liquid catalysts have been prepared by reacting a paraffinic, olefinic or cyclic hydrocarbon with aluminum chloride in the presence of HCl at elevated temperatures, with the result that the hydrocarbon is combined with the aluminum chloride to form a complex which is a mobile liquid. Ordinarily, additional aluminum chloride is dissolved or suspended in the mobile liquid to produce the active complex liquid catalyst for the said alkylation or isomerization reaction. In any event, the complex liquid catalyst, as initially formed, invariably has an apparent heat of hydrolysis in excess of about 300 small calories per gram of complex liquid, as calculated from the rise in temperature of the water in the calorimeter employed in the test, equivalent to an absolute heat of hydrolysis in excess of 318 calories per gram of complex liquid when corrected to include the heat absorbed by the calorimeter itself. By calibration of the calorimeter, it has been determined that a correction factor of 6% of the apparent value should be added to that value to convert it to the absolute value; and this applies to all of the heat of hydrolysis values referred to herein. The freshly prepared complex liquid catalysts, as well as the complex liquid catalysts containing added aluminum chloride, are totally unsuitable for purposes of the present invention; since alkylation of isobutane with butylene-2, or other $C_4$ olefins, with such catalysts, results in an alkylate having a clear CFRM octane lower than 85, and the catalyst life is poor.

By way of specific example, a typical aluminum chloride-hydrocarbon complex liquid is prepared by reacting kerosine with aluminum chloride and anhydrous HCl at 210° F. for four and one-half hours. Utilizing 1000 grams of aluminum chloride, 1628 grams of kerosine, and 50 grams of HCl under the conditions specified above, followed by separation of the resulting complex liquid from the unreacted kerosine by decantation, washing of the separated complex liquid with commercial pentane, and finally removing the dissolved pentane by distillation, 1400 grams of the complex liquid cataylst were obtained. This catalyst had an apparent heat of hydrolysis on mixing with water in a calorimeter of approximately 320 small calories per gram of complex liquid, equivalent to an absolute heat of hydrolysis of about 339 calories per gram.

Upon utilizing this complex liquid catalyst as freshly prepared for the alkylation of isobutane with butylene-2 in the presence of a small proportion of HCl under liquid phase conditions at temperatures within the range from 30 to 90° F., the usual poor quality of alkylate, which has heretofore been thought characteristic of the aluminum chloride catalyst on $C_4$ olefins, was obtained. However, by continuing this operation for a substantial period of time without addition of makeup aluminum chloride or fresh complex, which resulted in substantial reaction of the isobutane and butylene-2 with the aluminum chloride content of the complex liquid and consequent reduction in the heat of hydrolysis of that complex liquid, it was noted that the quality of the alkylate improved markedly as the operation proceeded.

When the operation was continued long enough, so that sufficient isobutane and butylene-2 reacted with the aluminum chloride content of the complex liquid to reduce the apparent heat of hydrolysis below about 240 calories per gram, equivalent to an absolute heat of hydrolysis below about 254 calories per gram, a good yield of high quality alkylate, of which at least 90% boiled in the 375° F. end point fraction, having a clear CFRM octane above 92, was obtained. Further improvement in alkylate quality continued until an optimum quality of around 96 CFRM octane was secured with an alkylation reaction zone temperature of around 60° F. at an apparent heat of hydrolysis value of about 225 calories per gram, equivalent to an absolute heat of hydrolysis value of about 239. Good yields of the high quality alkylate above 92 CFRM octane value continued to be secured until the apparent heat of hydrolysis value of the catalyst had declined to about 210 calories per gram, equivalent to about 223 calories per gram absolute. Below this value, the yield of alkylate declined and the resulting product was also unsaturated, indicating incomplete reaction of the olefin and too low an activity of the catalyst. Within the optimum range of catalyst activity, the heat of hydrolysis of the complex liquid declined very slowly, indicating excellent catalyst life.

In accordance with the present invention, isobutane is alkylated with butylene-2 in the liquid phase, and in the substantial absence of other olefinic constituents, at a temperature within the range of about 40-80° F., in the presence of an aluminum chloride-hydrocarbon complex liquid catalyst containing sufficient reaction product of isobutane and butylene-2 with the aluminum chloride content of the complex liquid catalyst to reduce the absolute heat of hydrolysis of said catalyst to within the range of about 220 to 255 small calories per gram of complex liquid. The operation is carried out under the usual liquid phase conditions, employing a substantial molar excess of isobutane to butylene-2 and, preferably, with efficient agitation. A contact time within the range of about 10-30 minutes is suitable, with around 15 minutes being preferred.

A substantial proportion of normal paraffin diluent, such as normal butane, can be tolerated in the reaction mix. Consequently, a suitable olefinic charge stock is the normal butane cut of a typical C4 cracking gas fraction, particularly such a fraction obtained from catalytic cracking. Preferably, this normal butane cut, from which the lighter isobutane cut containing most of the isobutylene and butylene-1 has been separated by fractionation, is pretreated with sulfuric acid of about 65-75% concentration to remove substantially all the isobutylene remaining therein. This provides a fraction enriched in butylene-2 and substantially free from other olefinic constituents. However, it will be understood that the butylene-2 can be obtained from any other suitable source. The isobutane for reaction therewith can be obtained by normal butane isomerization, fractionation of natural gasoline, or from any other suitable source.

The operation can be carried out in batch, but is preferably conducted in continuous manner, utilizing provisions for maintaining the complex liquid catalyst within the specified range of activity. For this purpose the isobutane feed stream may be divided, with a portion being mixed with the butylene-2 feed and a small amount of HCl, and the balance passed through an aluminum chloride saturator maintained at a controlled elevated temperature and containing lump aluminum chloride so that the isobutane stream, in the absence of olefin and HCl, dissolves a small amount of aluminum chloride and carries it into the reaction zone. Alternatively, the activity of the catalyst within the controlled range can be maintained by intermittently or continuously adding a small amount of aluminum chloride-hydrocarbon complex liquid having an absolute heat of hydrolysis above about 265, with intermittent or continuous withdrawal of a small amount of complex from the reaction zone to thereby maintain the desired catalyst to hydrocarbon volume ratio in the latter zone.

It will be understood that the above-described effective range of heat of hydrolysis of the complex liquid is far below that which is produced by forming fresh complex liquid, and is also far below that of complex liquid which is discharged as substantially spent from normal paraffin isomerization, isobutane-ethylene alkylation or isobutane-propylene alkylation. Consequently, an initial supply of complex liquid for the process can be conveniently and economically obtained from the spent complex from the isomerization or alkylation processes mentioned above, and then this complex liquid must initially be conditioned by reaction with isoparaffin and olefin, preferably the feed streams to be employed in the process, for a substantial period of time of the order of about 12-24 hours or more in order to reduce the heat of hydrolysis to within the effective range. Likewise, the spent complex from isomerization and alkylation can be utilized as the makeup hot complex fed to the reaction zone to maintain the activity of the preconditioned main body of complex liquid therein within the controlled range during continuous operation.

In the drawing, which illustrates a preferred embodiment of the present invention Fig. 1 is a diagrammatic view of apparatus for carrying out the alkylation step; and Fig. 2 is a graph showing a curve plotting ASTM octane number of the 375° F. end point alkylate against absolute heat of hydrolysis in calories per gram of the complex liquid catalyst.

Referring more particularly to Fig. 1, fresh and recycled isobutane feed is introduced by line 10. This feed is divided, with a portion passing by line 11 for mixing with the butylene-2 feed from line 12. The amount of isobutane supplied by line 11 is, preferably, in molar excess of the butylene-2 supplied by line 12, generally of the order of about 2:1 or higher; and the overall isobutane to olefin feed ratio is maintained within the range of about 3:1 to 8:1. A small portion of HCl, sufficient to maintain a concentration of HCl within the reactor of less than about 0.2% by weight on the basis of the hydrocarbon feed, and generally of the order of about 0.02-0.1%, is introduced by the line 13. The resulting mixed feed is forced by pump 14 through line 15 into reactor 16.

The balance of the isobutane feed is passed by pump 18 and line 19 into the lower portion of an aluminum chloride saturator 20 which is filled with lump aluminum chloride. The saturator is provided with a water jacket 21 through which hot water is passed by lines 22 and 23 to maintain the saturator at a mildly elevated temperature of the order of about 150-190° F. Adequate control of the amount of aluminum chloride dissolved in the isobutane stream passing in liquid phase through the saturator 20 is effected by regulating valve 24 to control the proportion of isobutane diverted to the saturator and by regulating the temperature and rate of supply of the hot water supplied to jacket 21. The resulting isobutane stream containing dissolved aluminum chloride passes by a lagged line 25 to the reactor 16.

A suitable type of agitated reactor is diagrammatically illustrated in the drawing. This comprises a cylindrical reaction vessel equipped with a cooling jacket 27, through which cooling water is circulated by lines 28 and 29. This is a side stirred reactor having a driven shaft 30 passing through a suitable stuffing box in the side wall and carrying in the lower portion of the reactor agitating blades 31. Surmounting the reactor and freely communicating therewith is a long column providing a settling zone 32 which communicates at its upper end by line 33 with sight glass 34 and overflow line 35.

In starting operation, the reactor 16 is supplied with sufficient aluminum chloride-hydrocarbon complex liquid to provide a catalyst to hydrocarbon ratio therein of about 1:1. The balance of the reactor system is then filled with isobutane. A feed stream of mixed isobutane, butylene-2, and HCl is then continuously introduced by line 15 for the conditioning period to reduce the heat of hydrolysis of the complex liquid to within the effective range set forth above. During this period, the emulsion formed within reactor 16 passes upwardly into the quiescent settling zone 32, where the complex liquid drops out and returns to the reactor. A clear hydrocarbon stream consisting of alkylate and excess isobutane overflows by line 35 and is diverted to separate tankage during the conditioning period. Samples of the complex liquid may be removed from the reactor from time to time by the valve controlled bottom drawoff 37 and analyzed for heat of hydrolysis.

When the complex liquid within the reactor system has been conditioned to the proper activity range, then normal continuous operation of the unit is commenced. During the first part of this period, all the isobutane feed may be supplied through line 11 to further reduce the heat of hydrolysis of the complex liquid to approximately the optimum activity level as specified. The hydrocarbon stream overflowing by line 35 is passed to the customary neutralizing and fractionating equipment (not shown) to recover the desired alkylate and also to recover excess isobutane for recycling in conventional manner. When the activity of the complex liquid has dropped to about the optimum level, or somewhat below, then a portion of the isobutane feed is diverted by line 19 through the aluminum chloride saturator 20 to carry a small amount of dissolved aluminum chloride into the reaction zone. The amount of makeup aluminum chloride required to maintain the desired activity level of the catalyst has been found to be approximately 2–10 grams of aluminum chloride per pound of butylene-2 charged. Roughly, about one-half of the isobutane feed for a molar ratio of isobutane to butylene-2 of around 3:1 to 6:1 will dissolve this required amount of aluminum chloride when operating the saturator at a temperature of about 150–190° F.

Due to the heating of this isobutane solution stream, and the exothermic heat of the alkylation reaction, positive cooling of the alkylation reaction zone by the circulation of chilled cooling water is required to maintain that zone at a temperature within the range of 40–80° F. At temperatures below about 40° F. the complex liquid tends to become too viscous for proper agitation and settling; and at temperatures above about 80° F., the desired high quality of alkylate is not secured. A temperature of about 60° F. in the reaction zone appears to be substantially optimum for the present reaction.

As an alternative, in place of using a portion of the isobutane feed to dissolve aluminum chloride and carry it into the reaction zone, the activity of the catalyst can be maintained in continuous operation by supplying a controlled amount of hot complex liquid thereto. As shown, hot complex liquid is supplied to a storage tank 40 by line 41, which may receive the same from the spent catalyst discharge line from isomerization or alkylation. This complex liquid, normally having an absolute heat of hydrolysis in excess of 265 calories per gram, generally of the order of about 300 calories per gram, is supplied in controlled amount by the valve controlled line 42 to line 25, and thence to the reactor 16. In order to prevent undue accumulation of complex liquid in the system during continuous operation with either the saturator 20 or the hot complex liquid makeup, a portion of the complex liquid may be discharged from the reactor from time to time by the bottom discharge line 37.

*Example 1*

The following is representative of a continuous run without catalyst fortification, starting with 1175 grams of aluminum chloride-hydrocarbon complex liquid having an apparent heat of hydrolysis of about 290, equivalent to an absolute heat of hydrolysis of about 307. The conditions of the run, utilizing substantially pure isobutane and butylene-2, were as follows:

| | |
|---|---|
| Temperature °F | 60 |
| Pressure, lbs. p. s. i | 175 |
| Charge rate, lbs. per hr | 3.3 |
| Contact time, minutes | 20 |
| Isobutane/olefin mol ratio | 3.6 |

The run was divided into periods of approximately 3⅓ hours each, with the alkylate being separately accumulated from the various periods. During the first five periods, representing a time interval of approximately 16⅔ hours, the catalyst was being conditioned by reduction in its heat of hydrolysis to the effective range. This was reached by the end of the fifth period, as is clearly shown by the following detailed data obtained during the sixth period of the run:

| | |
|---|---|
| Fresh feed, lbs | 11.1 |
|    Isobutane, grams | 3880 |
|    Butylene-2, grams | 1048 |
|    Normal butane, grams | 111 |
| Reacted mix, lbs | 11.2 |
|    Stabilized alkylate, grams | 2090 |
|    Lighter than pentane, grams | 25 |
|    Total $C_5+$ alkylate | 2030 |
|    Weight percent yield basis olefin charged | 194 |
| 375° F. EP fraction | |
|    Volume percent of total alkylate | 90.0 |
|    Density | 0.7062 |
|    Bromine No., less than | 1 |
|    Octane No. CFRM (clear) | 95.2 |
|    AFD-3c+4.6 Ml/TEL (rich) | S+6.0 |
|    AFD-3c+4.6 Ml/TEL (lean) | S+0.6 |

The foregoing data show the alkylate to not only have a high clear octane, but also to possess excellent lead susceptibility and to have a superior rich mixture rating.

*Example II*

The following example is representative of a continuous run in which the aluminum chloride saturator was employed to maintain the desired activity level of the complex liquid. This run was divided into periods of approximately 2⅓ hours, using a higher charge rate and the following operating conditions:

| | |
|---|---|
| Temperature °F | 60 |
| Pressure, lbs. p. s. i | 250 |
| Charge rate, lbs. per hr | 4.5 |
| Contact time, minutes | 17 |
| Isobutane/olefin mol ratio | 4.7:1 |

1340 grams of an aluminum chloride-hydrocarbon complex liquid having an apparent heat of hydrolysis of about 310, equivalent to an absolute heat of hydrolysis of about 329 were initially charged. As illustrating the progressive improvement in the quality of the alkylate obtained from successive periods of the run as the heat of hydrolysis was lowered to the effective range, the following table lists the results obtained during the initial periods of the run:

| Period | Wt. Per Cent Yield of Total Stabilized Alkylate, Basis Olefin Charged | Vol. Per Cent 375° F. EP Fraction of Total Alkylate | Clear CFRM Octane No. of 375° F. EP Fraction |
|---|---|---|---|
| A and B | | 94.8 | 82.1 |
| C | 196 | 95.7 | 81.7 |
| D | 205 | 94.6 | 84.0 |
| E | 186 | 94.3 | 85.2 |
| F | 224 | 94.0 | 90.4 |
| G | 215 | 95.4 | 92.8 |
| H | 205 | 96.7 | 94.8 |

The isobutane feed was divided, a portion passing through the aluminum chloride saturator operated at a temperature of about 185° F. Complete data for the ninth, or I period of the run, is tabulated below.

Charge:
| | |
|---|---|
| Isobutane-butylene-2, lbs | 3.7 |
| Isobutane through saturator, lbs | 6.0 |
| Total isobutane, grams | 3613 |
| Total butylene-2, grams | 700 |
| Total normal butane, grams | 90 |
| Aluminum chloride added in solution, grams (approx.) | 7.9 |
| Reacted mix, lbs | 10.55 |
| Stabilized alkylate, grams | 1625 |
| Lighter than pentane, grams | 79 |
| Total C₅+alkylate | 1546 |
| Weight percent yield stabilized alkylate basis olefin charged | 220 |
| 375° F. EP fraction | |
| Volume percent of stabilized alkylate | 93.8 |
| Density | 0.7045 |
| Bromine No | 0 |
| Clear CFRM octane No | 95.8 |

From the complete data for the run, the following calculations were made:

| | |
|---|---|
| Grams of makeup aluminum chloride added per pound of olefin charged | 4.7 |
| Gallons of alkylate per pound of aluminum charged | 30 |

A series of batch runs, and also short continuous runs without catalyst fortification, were made with complex liquids of varying heats of hydrolysis. From the data obtained in these runs, the curve illustrated in Fig. 2 of the drawing was plotted. In this graph, the absolute heat of hydrolysis of the complex liquid catalyst in calories per gram is plotted as abscissa and the clear ASTM octane number of the 375° F. endpoint alkylate fraction is plotted as ordinates. This shows that a customary spent complex from normal butane isomerization having an absolute heat of hydrolysis of about 310–320 calories per gram, produces from isobutane and butylene-2 a 375° F. endpoint alkylate having a clear CFRM octane number of about 80–82. It is only when the complex liquid has been reduced in activity to an absolute heat of hydrolysis of around 255 that a satisfactory alkylate having a clear CFRM octane number of about 92 or above is secured. The graph further shows that optimum quality alkylates of around 95 clear octane number are obtained with a complex liquid having an absolute heat of hydrolysis of about 225–240. However, this graph does not reflect the complete picture, since the yield of alkylate drops and its unsaturation increases at the upper end of the curve, or when the absolute heat of hydrolysis of the complex falls below about 220.

Analyses of the complex liquid catalyst produced as described above, and having heats of hydrolysis within the said effective range, have shown that the optimum catalyst for the present reaction possesses the following characteristics:

| | |
|---|---|
| Carbon and hydrogen, weight per cent | 41–42 |
| Chlorine | 43–45 |
| Carbon | 38–39 |

Due to the extremely long life of the catalyst, as well as the high quality of the product obtained, there is provided for the first time a process for the utilization of aluminum chloride in alkylating isobutane with butylene-2 which is economically competitive.

Obviously many modifications and variations of the invention, as hereinbefore set forth, may be made without departing from the spirit and scope thereof, but only such limitation should be imposed as are indicated in the appended claims.

What I claim is:

1. In the alkylation of isobutane in substantial molar excess with butylene in the liquid phase in the presence of an aluminum chloride-hydrocarbon complex liquid catalyst and a hydrogen chloride promoter, the improvement which comprises initially selecting an aluminum chloride-paraffin hydrocarbon complex liquid having an absolute heat of hydrolysis in excess of about 310 small calories per gram, conditioning that complex liquid by reaction with isobutane and butylene-2 in the absence of added aluminum chloride for a period of time of about 12–24 hours and until the absolute heat of hydrolysis of the complex liquid has dropped to at least about 255 but above 220 small calories per gram, then utilizing the preconditioned complex liquid, together with HCl promoter, for the reaction of isobutane with butylene-2 as substantially the sole olefinic constituent under alkylating conditions including a temperature within the range of about 40–80° F. to alkylate isobutane with butylene-2 as the principal reaction of the process, continuously maintaining the activity of the catalyst liquid within the range of 220–255 small calories per gram during continuance of the said alkylation reaction by the addition of a controlled small proportion of make-up aluminum chloride equivalent to approximately 2–10 grams per pound of butylene-2 charged, and recovering from the alkylation reaction products a total debutanized alkylate of which at least 90% by volume boils below 375° F. and has a clear CFRM octane number in excess of 92 with a catalyst life of at least about 30 gallons of alkylate per pound of aluminum chloride consumed.

2. The method according to claim 1, wherein the temperature is around 60° F., and the absolute heat of hydrolysis of the complex liquid is around 240 small calories per gram of complex liquid.

ERNEST F. PEVERE.

REFERENCES CITED

The following references are of record in the file of this patent:

UNITED STATES PATENTS

| Number | Name | Date |
| --- | --- | --- |
| 2,308,560 | Carmody et al. | Jan. 19, 1943 |
| 2,360,547 | Chenicek | Oct. 17, 1944 |
| 2,406,721 | Veltman | Aug. 27, 1946 |
| 2,407,390 | Watkins | Sept. 10, 1946 |
| 2,407,873 | Evering et al. | Sept. 17, 1946 |
| 2,434,000 | Matuszak | Jan. 6, 1948 |